United States Patent
Dayasindhu et al.

(10) Patent No.: US 8,601,431 B2
(45) Date of Patent: Dec. 3, 2013

(54) METHOD AND SYSTEM FOR IDENTIFYING SOFTWARE APPLICATIONS FOR OFFSHORE TESTING

(75) Inventors: Nagarajan Dayasindhu, Bangalore (IN); Venkatakrishnan Balasubramanian, Trichy (IN); Ankur Chhabra, Faridabad (IN)

(73) Assignee: Infosys Limited (IN)

( * ) Notice: Subject to any disclaimer, the term of this patent is extended or adjusted under 35 U.S.C. 154(b) by 924 days.

(21) Appl. No.: 12/633,090

(22) Filed: Dec. 8, 2009

(65) Prior Publication Data

US 2010/0153155 A1    Jun. 17, 2010

(30) Foreign Application Priority Data

Dec. 11, 2008    (IN) .......................... 3107/CHE/2008

(51) Int. Cl.
    *G06F 9/44*    (2006.01)
(52) U.S. Cl.
    USPC ........................... 717/101; 717/102; 717/124
(58) Field of Classification Search
    None
    See application file for complete search history.

(56) References Cited

U.S. PATENT DOCUMENTS

| | | | |
|---|---|---|---|
| 7,958,495 B2 * | 6/2011 | Kelso | 717/124 |
| 2004/0128651 A1 * | 7/2004 | Lau | 717/124 |
| 2005/0132332 A1 * | 6/2005 | Sathe | 717/124 |
| 2009/0138856 A1 * | 5/2009 | Oja et al. | 717/126 |
| 2009/0199160 A1 * | 8/2009 | Vaitheeswaran et al. | 717/124 |
| 2009/0307763 A1 * | 12/2009 | Rawlins et al. | 726/5 |

* cited by examiner

*Primary Examiner* — Kris Rhu
(74) *Attorney, Agent, or Firm* — Lerner, David, Littenberg, Krumholz & Mentlik, LLP

(57) ABSTRACT

The present invention provides a method and system for evaluating a plurality of software applications for offshore testing. A criteria model including one or more criteria for assessing the viability of offshore testing is defined by one or more tool administrators. Thereafter, one or more experts assign scores to the plurality of software applications with reference to the criteria model. One or more cumulative scores may then be calculated for each of the plurality of software applications based on the assigned scores. Further, a graph may be generated on the basis of the one or more cumulative scores. Subsequently, one or more software applications are identified for offshore testing. A transition plan for offshore testing of the one or more software applications may also be defined.

22 Claims, 15 Drawing Sheets

| | Sub Section Name | Sub Section Type | Save |
|---|---|---|---|
| | 602a | 602b | 604a |

| Field name | Reference Data Type |
|---|---|
| 606a — Field 1 | 602c |
| 606b — Field 2 | 602d |
| 606c — Field 3 | 602e |
| 606d — Field 4 | 602f |
| 606e — Field 5 | 602g |
| 604b — Save | |

FIG. 6   318

| | Sub criterion Name | | 708 — Scoring Guidelines |
|---|---|---|---|
| | | | Score ☐ 706 |
| | Support data — 710 | | |
| S.No | Question | | Response |
| 1 | Question 1 | | ☐ —702a |
| 2 | Question 2 | | ☐ —702b |
| 3 | Question 3 | | ☐ —702c |
| 4 | Question 4 | | ☐ —702d |
| Save —704 | | | |

308

☐ Criteria Model
☐ Criterion 1
   Sub-Criterion 1
   Sub-Criterion 2
   Sub-Criterion 3
☐ Criterion 2
   Sub-Criterion 3
   Sub-Criterion 4
   Sub-Criterion 5

METHOD AND SYSTEM FOR IDENTIFYING SOFTWARE APPLICATIONS FOR OFFSHORE TESTING

BACKGROUND OF THE INVENTION

The present invention relates to offshoring of applications. More specifically, the present invention relates to offshore testing of software applications.

A portfolio of software applications of an enterprise includes one or more software applications that support one or more functions of the enterprise. In an effort to improve business value from their software applications, enterprises often source new services from offshore vendors. While examining new services such as offshore testing of software applications, enterprises typically focus on evaluation of the technical expertise of the offshore vendors and the maturity of processes required for testing. Often, during examination, specific testing requirements for different software applications in the software application portfolio may not be taken into consideration. Such an examination process is suited for the evaluation of offshore vendors which are involved in providing testing services for the software applications from a development stage of the software applications.

However, if the offshore vendors have not been involved in providing testing services from an early stage of development of the software applications, the testing requirements of such individual software applications in the portfolio also need to be considered. In such a scenario, it is important to assess the readiness of the offshore vendors for offshore testing of individual applications in the software application portfolio. Therefore, enterprises need to define an analysis framework for identifying software applications suitable for offshore testing. There is also a need to prepare a transition plan in order to transition the identified software applications over multiple phases to the offshore vendors for testing.

In light of the discussion above, there is a need for a method and system for defining a structured approach to analyze the software application portfolio of an enterprise in order to identify one or more software applications for offshore testing. Further, there is a need to prepare a transition plan to transition offshore testing of the identified one or more software applications.

BRIEF SUMMARY OF THE INVENTION

An object of the invention is to define a framework for analyzing a software application portfolio of an enterprise to identify one or more software applications for offshore testing.

Another object of the invention is to prepare a transition plan for offshore testing of the identified one or more software applications.

To achieve the objectives mentioned above, the invention provides a method and system for evaluating a plurality of software applications for offshore testing. A criteria model including one or more criteria is defined. The criteria are defined to assess the viability of offshore testing of software applications. Weights may also be defined for each of the criteria on the basis of the relative importance of the criteria in assessing offshore testing. One or more experts then assign scores to each of the plurality of software applications with reference to each of the criteria. Further, one or more cumulative scores are calculated on the basis of the assigned scores and the weights. Thereafter, a graph may be generated on the basis of the cumulative scores for evaluating the plurality of software applications. Subsequently, one or more software applications are identified for offshore testing on the basis of the graph. A transition plan for offshore testing is also defined for offshoring the identified software applications.

The criteria model and scoring process ensures that individual testing requirements of each software application are analyzed by the one or more experts. Further, the transition plan ensures the internal readiness of offshore vendors before taking up offshore testing of the plurality of software applications.

BRIEF DESCRIPTION OF THE DRAWINGS

The various embodiments of the invention will hereinafter be described in conjunction with the appended drawings, provided to illustrate and not to limit the invention, wherein like designations denote like elements, and in which:

FIG. 6 is a block diagram of an exemplary parameter definition module, in accordance with an embodiment of the invention;

FIG. 7 is a block diagram of an exemplary score assignment module, in accordance with an embodiment of the invention;

FIG. 11 is a screenshot of a user interface of a system for evaluating a plurality of software applications for offshore testing, in accordance with another exemplary embodiment of the invention;

DETAILED DESCRIPTION

The invention describes a method and system for identifying one or more software applications from a plurality of software applications for offshore testing. The method includes defining a criteria model including one or more criteria for assessing the viability of offshore testing of the plurality of software applications. Further, weights may also be assigned to the one or more criteria, wherein the weights are assigned on the basis of the relative importance of the one or more criteria in assessing offshore testing. Thereafter, one or more experts assign scores to the plurality of software applications with reference to the one or more criteria. One or more cumulative scores may then be calculated for each of the one or more criteria using the assigned scores and the weights. Subsequently, the plurality of software applications are evaluated on the basis of the one or more cumulative scores and one or more software applications are identified for offshore testing.

Figure 1:
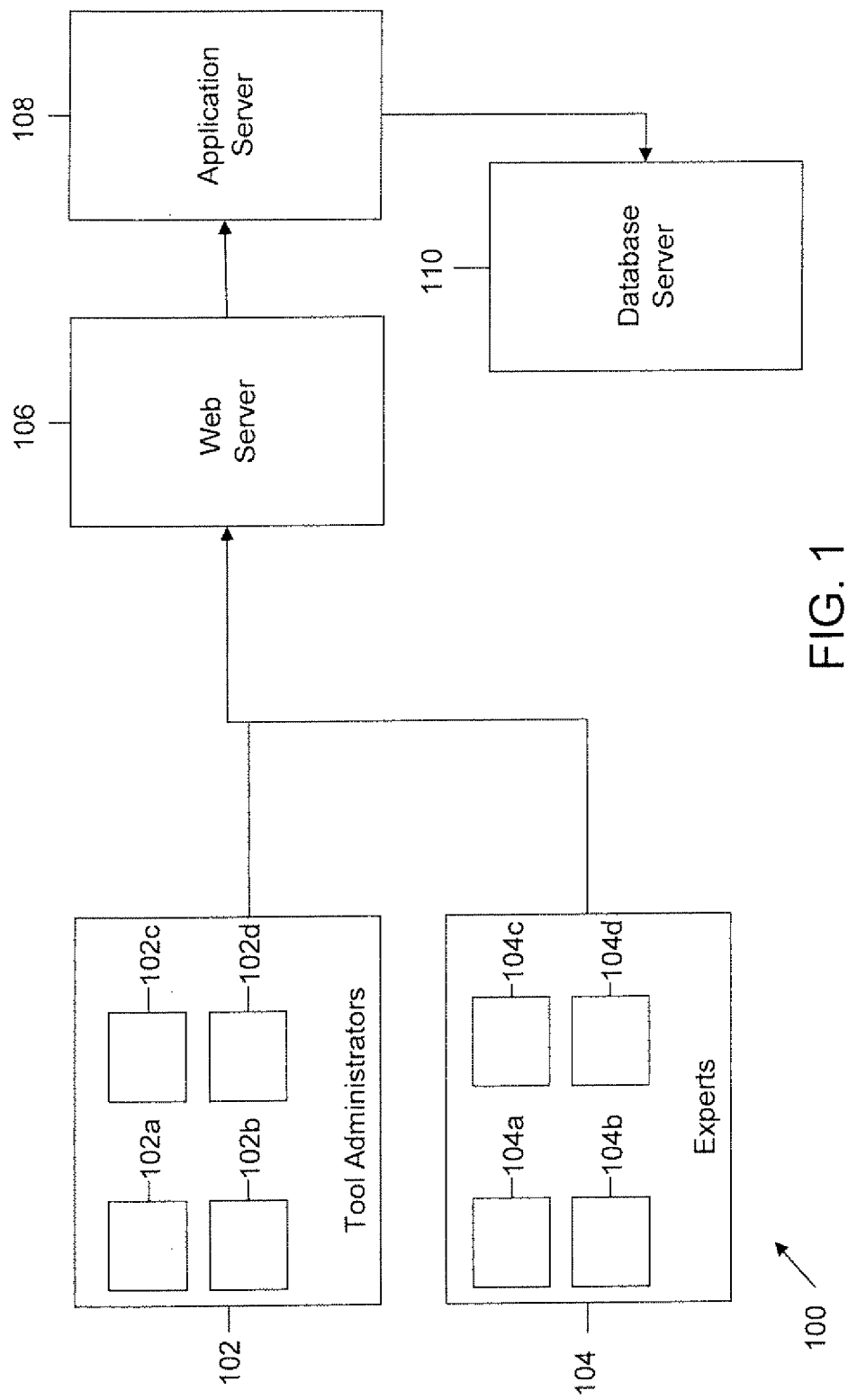
FIG. 1 illustrates an environment in which various embodiments of the invention may be practiced.

FIG. 1 illustrates an environment 100 in which various embodiments of the invention may be practiced. Environment 100 includes one or more tool administrators, such as tool administrators 102a, 102b, 102c and 102d, hereinafter referred to as tool administrators 102; one or more experts, such as experts 104a, 104b, 104c and 104d, hereinafter referred to as experts 104; a web server 106; an application server 108; and a database server 110.

In an embodiment of the invention, tool administrators 102 define a plurality of software applications to be evaluated, wherein the plurality of software applications support one or more functions of a business establishment. Tool administrators 102 also define a criteria model comprising one or more criteria for evaluating the plurality of software applications. Further, tool administrators 102 may also assign weights to the one or more criteria, based on the relative importance of the one or more criteria in offshore testing.

Thereafter, experts 104 assign scores to the plurality of software applications with reference to the criteria model. In an embodiment of the invention, tool administrators 102 and experts 104 may be the same.

Web server 106 enables tool administrators 102 and experts 104 to access and update the information related to the plurality of software applications. Application server 108 includes the business logic related to the evaluation of the plurality of software applications for offshore testing. Database server 110 includes various database entities to support the storage of information related to the evaluation process. The method for evaluating the plurality of software applications is described in conjunction with FIG. 2.

Figure 2A:
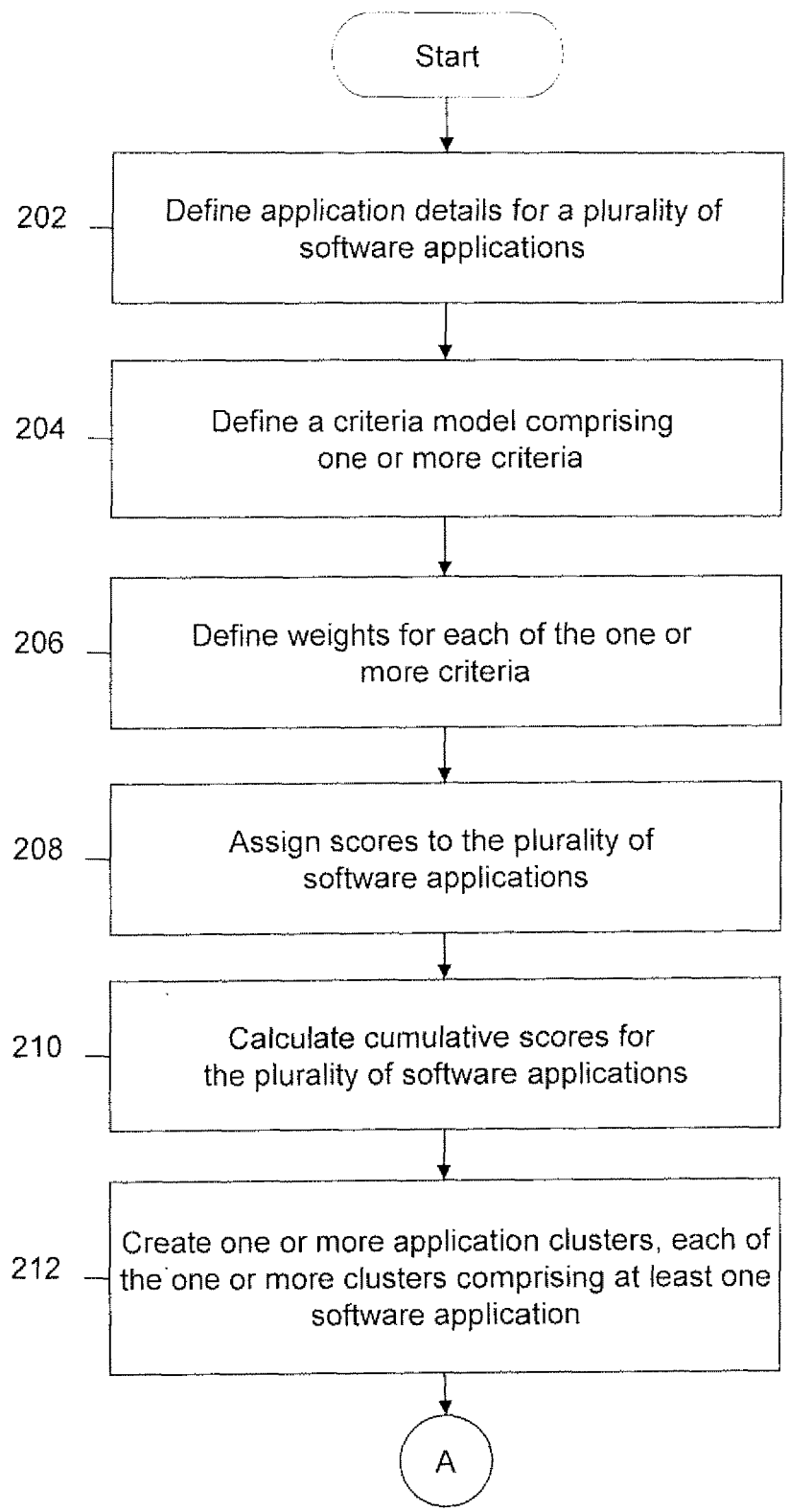
FIG. 2A and FIG. 2B illustrate a flowchart for identifying one or more software applications for offshore testing, in accordance with an embodiment of the invention.
Figure 2B:
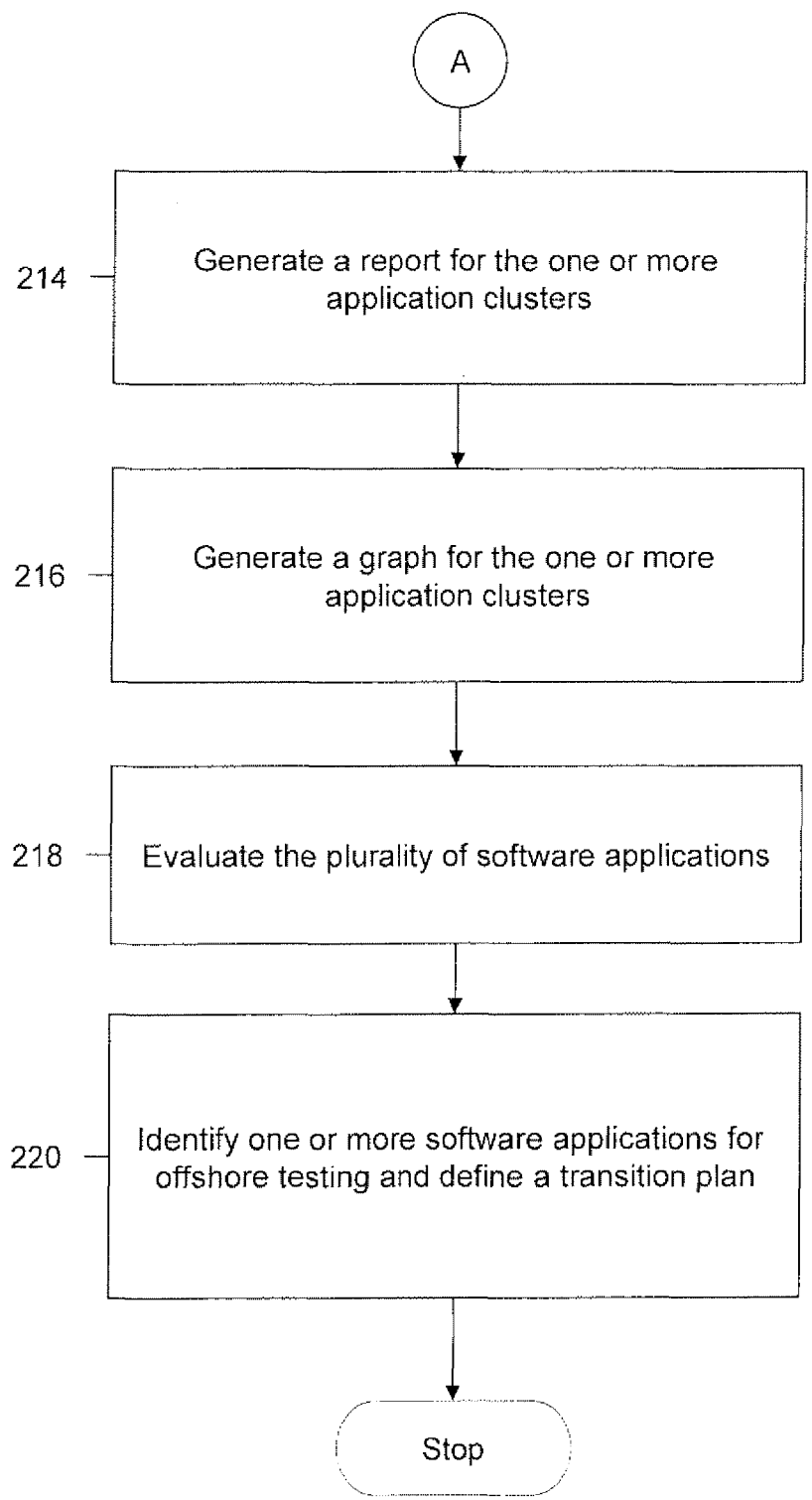

FIG. 2A and FIG. 2B illustrate a flowchart for identifying one or more software applications for offshore testing, in accordance with an embodiment of the invention.

At 202, application details for a plurality of software applications are defined corresponding to a set of predefined parameters. In various embodiments of the invention, the set of predefined parameters may correspond to testing details, technology details and support details of the plurality of software applications. For example, the set of predefined parameters may include parameters such as 'Availability of test scripts' and 'Type of testing tools used'. The application details for the plurality of software applications may then be defined corresponding to the set of predefined parameters. At 204, a criteria model comprising one or more criteria is defined for assessing the viability of offshoring testing services for the plurality of software applications. These criteria may include complexity in providing offshore testing services, maturity of the process required for testing, and benefits and operational risks of offshore testing and the like. In another embodiment of the invention, one or more sub-criteria may also be defined for the one or more criteria. For example, a criterion may be defined as 'Testing domain attractiveness', and a corresponding sub-criterion may be defined as 'Testing service complexity'.

At 206, weights are defined for each of the criteria, based on the relative importance of the criteria in offshore testing. In an embodiment of the invention, the weights may be defined by one or more tool administrators such as tool administrators 102. The tool administrators may include a Test Manager or a Quality Assurance Manager for the software applications.

At 208, one or more experts such as experts 104 assign scores to the plurality of software applications with reference to each of the one or more criteria. Further, at 210, one or more cumulative scores are calculated for each of the plurality of software applications using the defined weights and the assigned scores.

In an embodiment of the invention, the scores assigned to a software application with respect to each of the one or more sub-criteria may be multiplied with the corresponding weights. Cumulative scores may then be calculated for each of the criteria by aggregating the products of the scores and the respective weights defined for the sub-criteria under the corresponding criterion.

Thereafter, at 212, one or more application clusters may be created. Each cluster includes at least one of the plurality of software applications. In various embodiments of the invention, the application clusters may be created by classifying the software applications on the basis of parameters such as business unit, geography, division, technology and the like. Further, at 214, a report is generated for each of the application clusters. The report may be generated on the basis of the one or more cumulative scores of the at least one application cluster included in the one or more application clusters.

At 216, a graph may be generated for the application clusters for evaluating the software applications for offshore testing. In an embodiment of the invention, the graph may be generated using the data in the report. In an embodiment of the invention, cumulative scores for two criteria may be plotted along the X-axis and the Y-axis for generating the graph. In another embodiment of the invention, the graph may be generated only on the basis of the assigned scores. In yet another embodiment of the invention, the software applications may be evaluated individually and not in clusters.

Subsequently, at 218, the plurality of software applications may be evaluated using the generated graph. The plurality of software applications may then be grouped into two or more quadrants of the graph for evaluation. For example, one or more software applications grouped into one quadrant of the graph may be classified as software applications that are ideal for offshore testing. One or more software applications grouped into a second quadrant may be classified as software applications corresponding to which an offshore vendor needs to build domain competencies before taking up offshore testing of the software applications and so forth. Finally, at 220, one or more software applications are identified from the plurality of software applications for offshore testing and a transition plan for the identified software applications is defined. The transition plan may be defined on the basis of the classification of the software applications into the quadrants.

Figure 3:
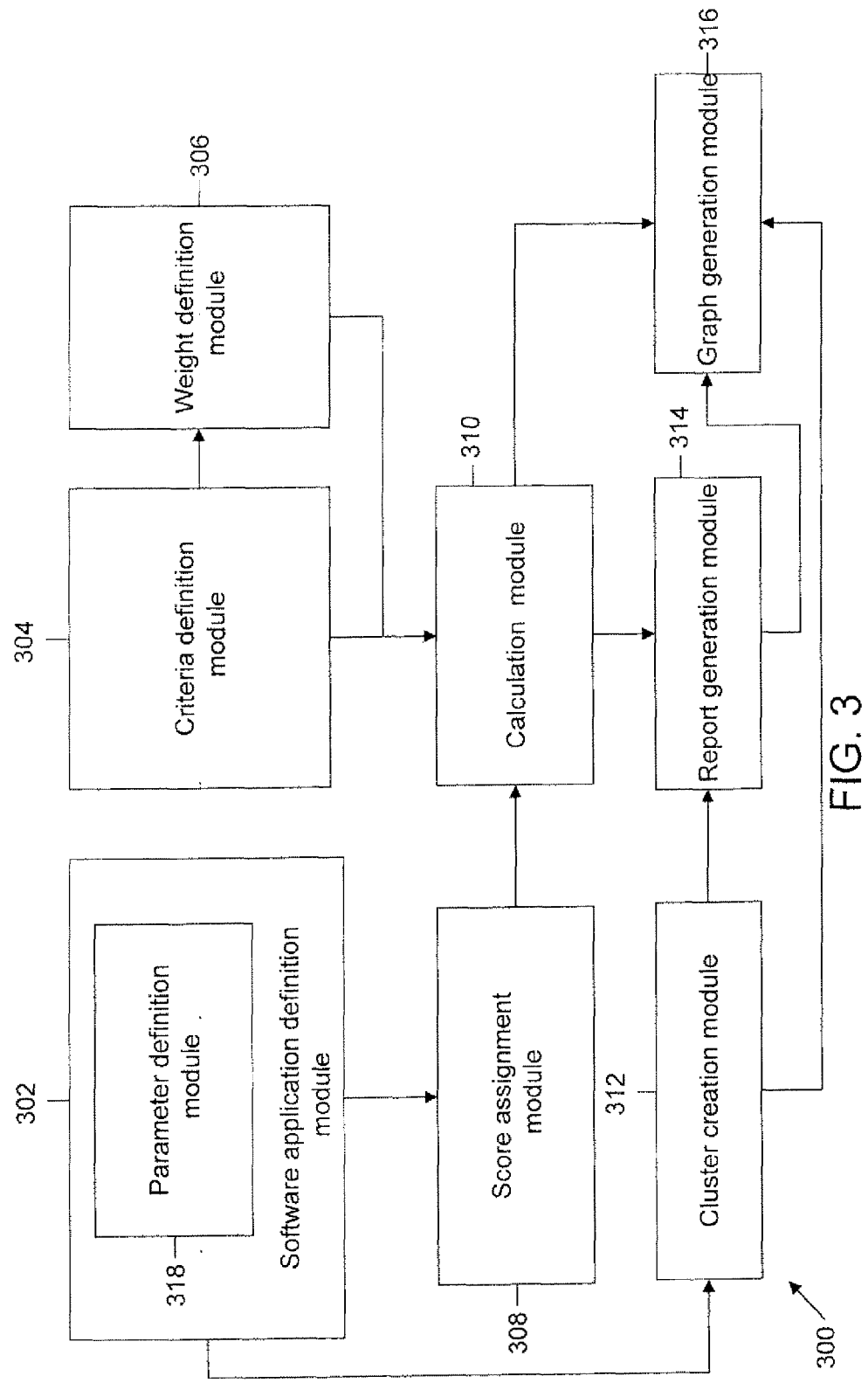
FIG. 3 is a block diagram of a system for identifying one or more software applications for offshore testing, in accordance with an embodiment of the invention.

FIG. 3 is a block diagram of a system 300 for identifying one or more software applications for offshore testing, in accordance with an embodiment of the invention. System 300 includes a software application definition module 302, a criteria definition module 304, a weight definition module 306, a score assignment module 308, a calculation module 310, a cluster creation module 312, a report generation module 314, and a graph generation module 316. Software application definition module 302 includes a parameter definition module 318.

Software application definition module 302 enables tool administrators 102 to define details corresponding to a plurality of software applications to be evaluated. Parameter definition module 318 enables tool administrators 102 to define a set of parameters on the basis of which the plurality of software applications are evaluated. In various embodiments of the invention, the set of parameters may correspond to technology details, support details and testing details of the software applications. Application details corresponding to each of the plurality of software applications are defined on the basis of the set of parameters. For example, the set of parameters may be defined as 'Test environment details', 'Availability of test cases', 'Type of testing tools used', and 'Availability of test plans'. These parameters enable tool administrators 102 to define testing details corresponding to the software applications using which experts 104 evaluate the software applications on the basis of one or more criteria.

Criteria definition module 304 enables tool administrators 102 to define one or more criteria for assessing the viability of offshore testing. One or more sub-criteria may also be defined for the one or more criteria. For example, one or more criteria may be defined as 'Testing domain attractiveness' and 'Testing process attractiveness'. Further, the one or more sub-criteria corresponding to the one or more criteria may include 'Service complexity' and 'Process maturity', respectively.

Thereafter, weight definition module 306 enables tool administrators 102 to define weights corresponding to the one or more criteria. The weights may be defined based on the relative importance of the one or more criteria in offshore testing. In an embodiment of the invention, the weights may be defined only for the one or more sub-criteria.

Score assignment module 308 enables experts 104 to assign scores to the plurality of software applications based on a predefined scale. Further, calculation module 310 calculates one or more cumulative scores for the plurality of software applications with reference to each of the one or more criteria based on inputs received from weight definition module 306 and score assignment module 308. In an embodiment of the invention, the cumulative scores may be calculated by aggregating the products of the assigned scores and the corresponding weights for each sub-criterion defined under each criterion.

Cluster creation module 312 enables tool administrators 102 to create one or more clusters including at least one software application from the plurality of software applications. The clusters may be created by classifying the plurality of software applications on the basis of parameters such as business unit, division, geography, technology, business process, and application owner. For example, with reference to a software application portfolio of a business establishment in the banking sector, the software applications may be classified under business units such as 'retail banking' and 'treasury'. The software applications may then be further classified according to their functional areas such as 'credit cards', 'settlements' and 'loans'. Thereafter, one or more clusters may be created by segmenting the software applications under each functional area on the basis of application owners.

Report generation module 314 generates a report for each of the application clusters based on the cumulative scores. Further, graph generation module 316 generates a graph for the software applications based on the cumulative scores. In an embodiment, the cumulative scores may be plotted on the X-axis and Y-axis for generating the graph.

Subsequently, experts 104 use the generated graph to evaluate the plurality of software applications and identify one or more software applications for offshore testing.

In an exemplary embodiment, one or more criteria and corresponding sub-criteria along with the respective weights may be defined using criteria definition module 304 and weight definition module 306 as follows:

| Criteria | Sub-criteria | Weight |
| --- | --- | --- |
| Testing Domain Attractiveness | Service complexity | 40 |
| | Business benefits | 60 |
| Testing Process Attractiveness | Process maturity | 70 |
| | Operational risks | 30 |

Further, scores may be assigned to a software application with reference to the criteria model based on a scale of 1 to 5 through score assignment module 308 as illustrated. Calculation module 310 may then calculate one or more cumulative scores for the software application using the assigned scores and defined weights as follows:

| Criteria | Sub-criteria | Score | (Score*Weight)/100 | Cumulative score |
| --- | --- | --- | --- | --- |
| Testing Domain Attractiveness | Service complexity | 3 | 120/100 | 2.4 |
| | Business benefits | 2 | 120/100 | |
| Testing Process Attractiveness | Process maturity | 5 | 350/100 | 4.1 |
| | Operational risks | 2 | 60/100 | |

After assigning scores and calculating the one or more cumulative scores for each of the plurality of software applications, a graph may be generated. The graph may be generated by plotting the cumulative scores of 'Testing domain attractiveness' and 'Testing process attractiveness' with respect to each software application on the X-axis and the Y-axis, respectively.

The generated graph may then be used to classify the plurality of software applications into four quadrants and to define a transition plan for offshore testing. The plurality of software applications may be classified as follows:

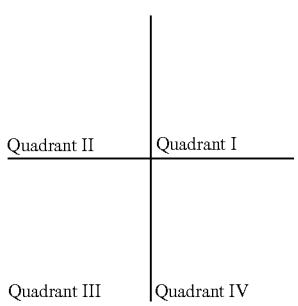

In the exemplary embodiment, software applications in Quadrant I of the graph may be identified as software applications that are ideal for offshore testing. Further, software applications in Quadrant II may be identified as software applications to which an offshore vendor needs to build domain competencies before testing services may be offshored to the offshore vendor. Software applications in Quadrant III may be identified as software applications that are not ready for offshore testing and require planning and coordination between the business establishment and the offshore vendor before offshoring testing services. Further, software applications in Quadrant IV may be classified as software applications that may be considered for offshore testing at a later stage.

Therefore, the graph may be used to transition the software applications for offshore testing.

Figure 4:
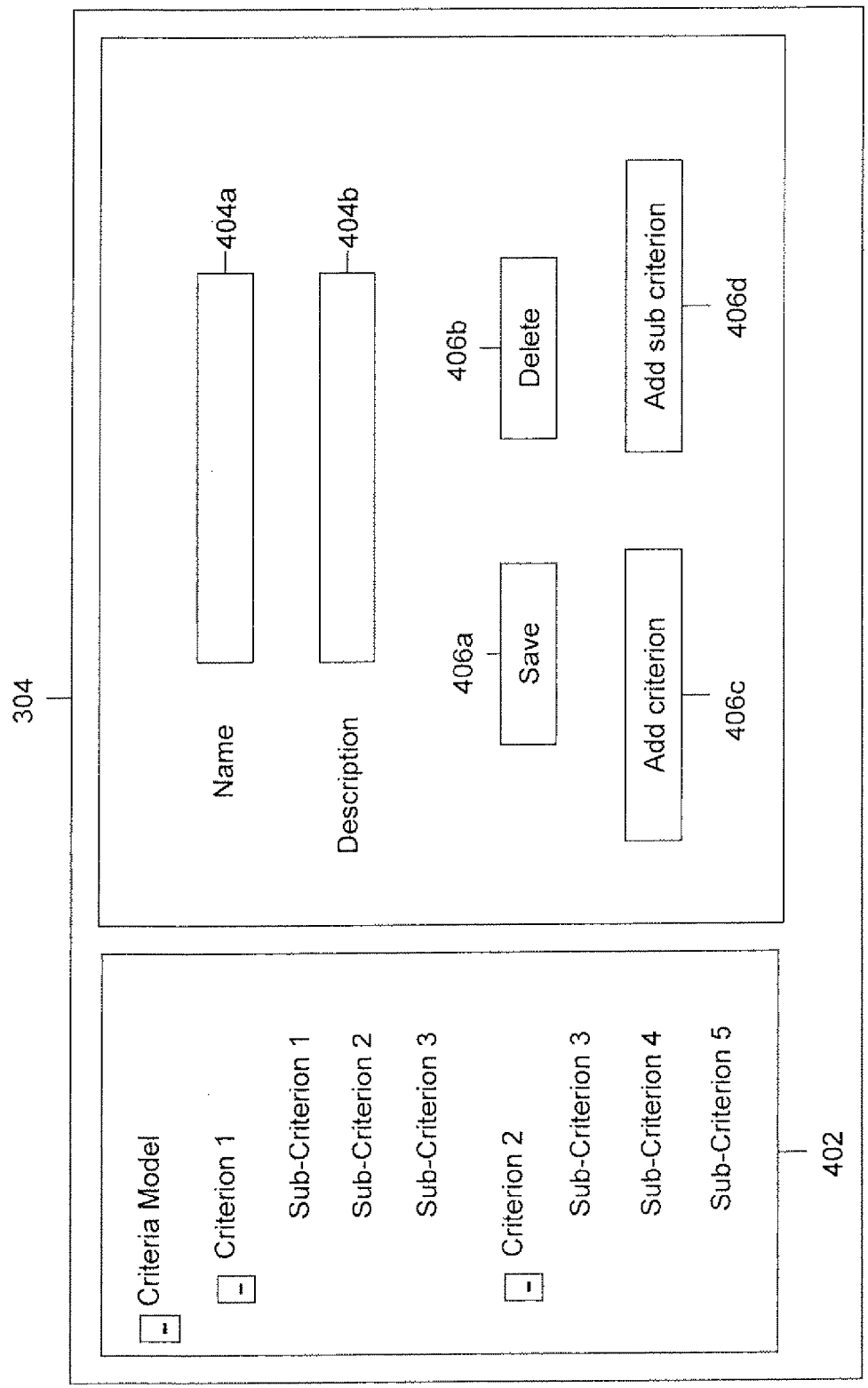
FIG. 4 is a block diagram of an exemplary criteria definition module, in accordance with an embodiment of the invention.

FIG. 4 is a block diagram of an exemplary criteria definition module such as criteria definition module 304, in accordance with an embodiment of the invention. Criteria definition module 304 includes a criteria model 402; a plurality of textboxes such as textbox 404a and textbox 404b, hereinafter referred to as textboxes 404; and a plurality of buttons such as a save button 406a, a delete button 406b, an add criterion button 406c, and an add sub-criterion button 406d.

Criteria model 402 comprises one or more criteria for assessing the viability of offshore testing. One or more sub-criteria are also defined for each of the one or more criteria.

A tool administrator from tool administrators 102 may click on a criterion in criteria model 402 and define a corresponding name and description of the selected criterion in textbox 404a and textbox 404b, respectively. The details entered in textboxes 404 may then be saved by clicking on save button 406a.

The selected criterion and the corresponding sub-criteria may also be deleted by clicking on delete button 406b. Further, a criterion may be added by clicking on add criteria button 406c. Also, a sub-criterion may be defined under the selected criterion by clicking on add sub-criterion button 406d.

Further, a set of questions (not shown in the figure) may also be associated with each of the one or more criteria in criteria model 402 to assist experts 104 in evaluating the software applications with reference to the one or more criteria. In various embodiments of the invention, experts 104 may refer to the set of questions for accessing information pertaining to the corresponding criterion, in order to assign scores to the software applications.

Figure 5:
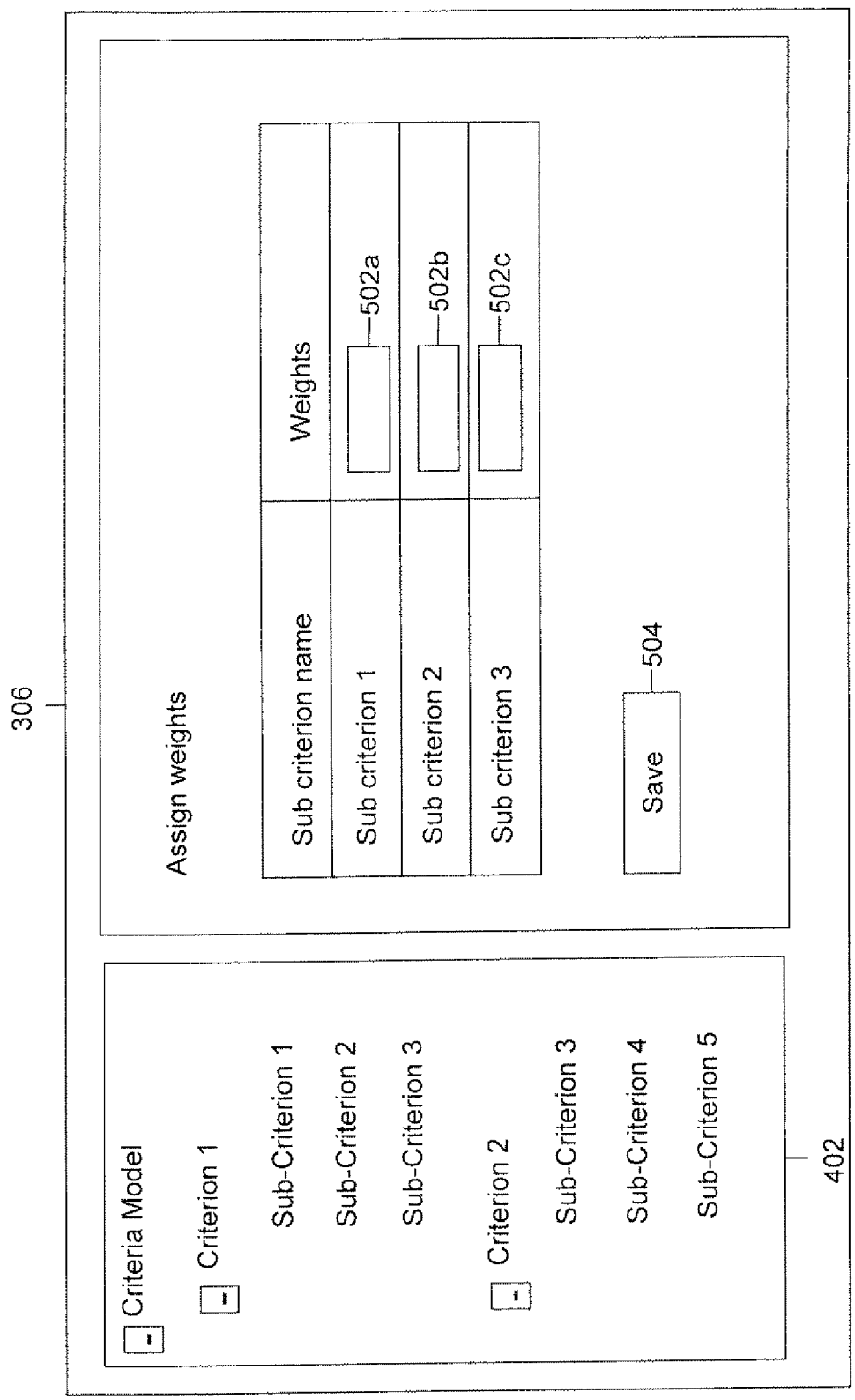
FIG. 5 is a block diagram of an exemplary weight definition module, in accordance with an embodiment of the invention.

FIG. 5 is a block diagram of an exemplary weight definition module such as weight definition module 306, in accordance with an embodiment of the invention. Weight definition module 306 includes criteria model 402; a plurality of textboxes such as textbox 502a, 502b and 502c, hereinafter referred to as textboxes 502; and a save button 504.

Weight definition module 306 enables tool administrators 102 to define weights corresponding to each of the one or more sub-criteria. In another embodiment of the invention, weights may also be defined for each of the one or more criteria.

Weights corresponding to each of the one or more sub-criteria defined under one criterion may be entered in textboxes 502. Thereafter, the defined weights may be saved by clicking on save button 504.

FIG. 6 is a block diagram of an exemplary parameter definition module such as parameter definition module 318, in accordance with an embodiment of the invention. Parameter definition module 318 includes a plurality of textboxes such as textbox 602a, 602b, 602c, 602d, 602e, 602f and 602g, hereinafter referred to as textboxes 602; a plurality of buttons such as save button 604a and save button 604b; and a plurality of checkboxes such as checkbox 606a, 606b, 606c, 606d and 606e, hereinafter referred to as checkboxes 606.

Parameter definition module 318 enables tool administrators 102 to define a set of parameters corresponding to which application details related to the plurality of software applications may be defined.

In an embodiment of the invention, the set of parameters may be classified into sections such as application overview, technology details, and support details. The sections may consist of one or more sub-sections. The name and type of a sub-section may be defined in textbox 602a and 602b, respectively. The sub-section type may be 'Multi-row' or 'Single-row' depending on whether multiple values or a single value of data needs to be provided as an input for the sub-section. For example, the name of the sub-section may be entered as 'Testing details' and the corresponding sub-section type may be defined as 'Multi-row' if multiple values for data may be provided as input. The name and type details of the section may be saved by clicking on save button 604a.

In an embodiment of the invention, a set of parameters may be defined and stored. For the evaluation of the plurality of software applications, one or more parameters may be selected from the stored set of parameters. Checkboxes 606 may be checked in order to select one or more parameters from the set of parameters. The reference data type for each field may be entered in a corresponding textbox 602. For example, 'Field 1' may be selected by checking checkbox 606a. A reference data type corresponding to 'Field 1' may be specified in textbox 602c. In various embodiments of the invention, new fields may be added to the set of parameters. The set of parameters may then be saved by clicking on save button 604b.

In various embodiments of the invention, the software applications are defined according to the selected set of parameters. In an embodiment of the invention, a template containing the set of parameters may be generated using software application definition module 302 to enable tool administrators 102 to define application details related to the software applications. The application details may then be defined in the template and the template may be uploaded subsequently in software application definition module 302.

In an embodiment of the invention, application details corresponding to each of the plurality of software applications may be defined in the generated template. In another embodiment of the invention, a separate template may be generated for each software application.

FIG. 7 is a block diagram of an exemplary score assignment module such as score assignment module 308, in accordance with an embodiment of the invention. Score assignment module 308 includes criteria model 402; a plurality of textboxes such as textbox 702a, 702b, 702c and 702d, hereinafter referred to as textboxes 702; a save button 704, a textbox 706 a 'Scoring Guidelines' hyperlink 708 and a 'Support data' hyperlink 710.

As experts 104 click on a criterion in criteria model 402, a score corresponding to the selected criterion may be assigned by experts 104 in textbox 706, based on a predefined scale. Experts 104 may refer to the predefined scale by clicking on 'Scoring Guidelines' hyperlink 708.

Further, experts 104 may click on 'Support data' hyperlink 710 in order to refer to a set of support data associated with each of the one or more criteria to assign scores to the software applications. In an embodiment of the invention, the set of support data may refer to the parameters defined through parameter definition module 318. In addition, a set of questions describing the criteria may be associated with each criterion to assist experts 104 to assign scores to the software applications. The responses to the questions for each criterion may be entered in corresponding textboxes 702. The set of responses entered by experts 104 may be stored for reference at a later stage. Subsequently, the score and the set of responses to the questions may be saved by clicking on save button 704.

After the weights have been defined for the one or more criteria and the scores have been assigned to the plurality of software applications, calculation module 310 (not shown in the figure) calculates the cumulative scores for each of the plurality of software applications.

In an embodiment of the invention in which one or more sub-criteria are defined for each of the one or more criteria, the product of the assigned score and weight may be calculated for each sub-criterion. Further, the products corresponding to each of the one or more sub-criteria defined under each criterion may be aggregated to calculate a cumulative score for the respective criterion.

Tool administrators 102 may create one or more clusters using cluster creation module 312, wherein each cluster comprises at least one software application. The one or more clusters may be created by classifying the plurality of software applications on the basis of factors such as geography, business unit, and operating technology.

Figure 8:
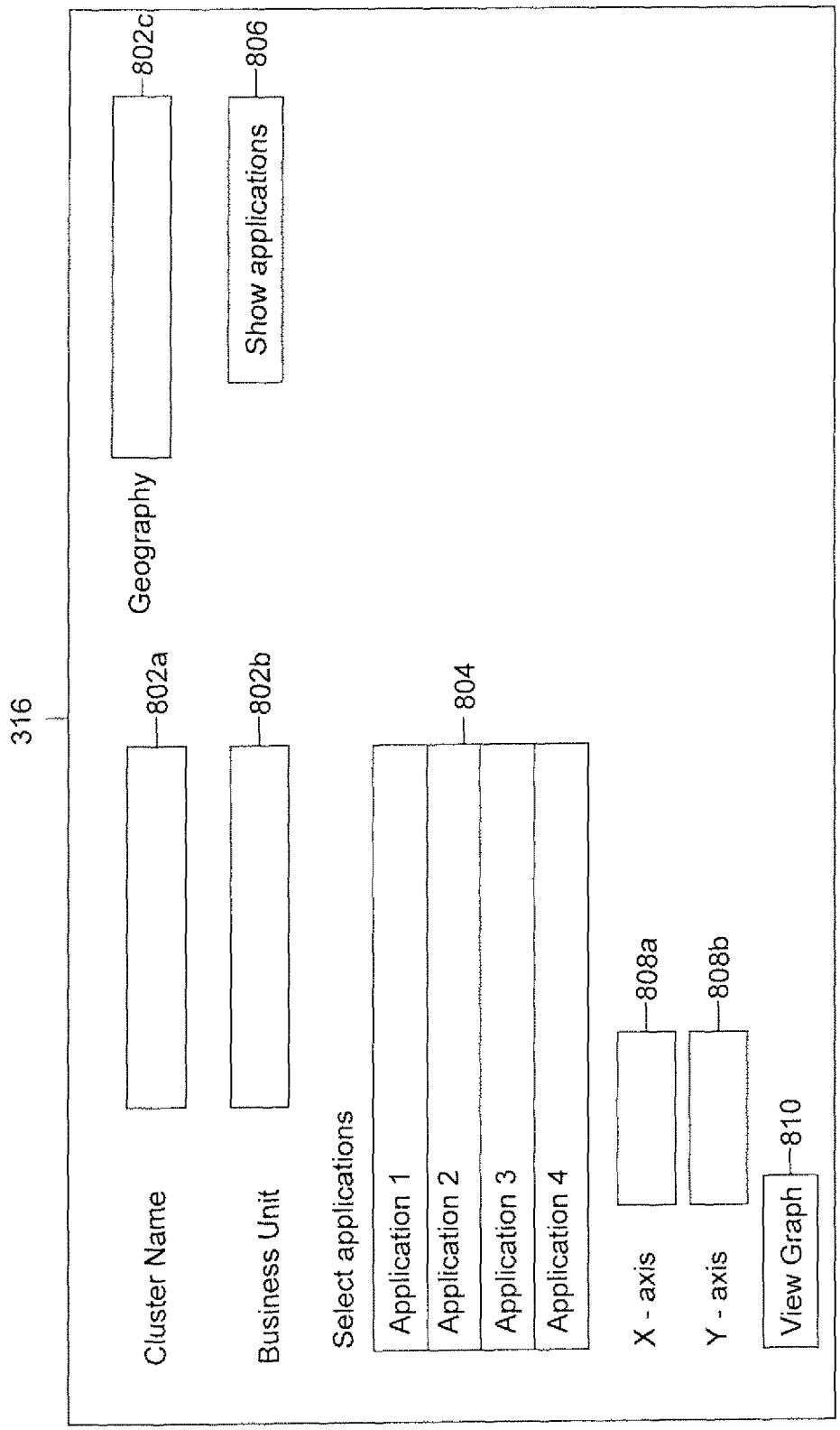
FIG. 8 is a block diagram of an exemplary graph generation module, in accordance with an embodiment of the invention.

FIG. 8 is a block diagram of an exemplary graph generation module such as graph generation module 316, in accordance with an embodiment of the invention. Graph generation module 316 includes a plurality of textboxes such as textbox 802a, 802b and 802c, hereinafter referred to as textboxes 802; a list box 804; a plurality of buttons such as a 'Show applications' button 806 and 'View graph' button 810; and a plurality of drop-down menus such as a drop-down menu 808a and a drop-down menu 808b. Graph generation module 316 enables experts 104 to generate graphs for the one or more clusters defined by using cluster creation module 312. The name of the cluster for which a graph needs to be generated may be entered in textbox 802a. In an embodiment of the invention, textbox 802a may be a drop-down menu for enabling experts 104 to select a corresponding name.

A graph may be generated for one or more software applications in a cluster. For example, values for 'Business unit' and 'Geography' may be entered in textbox 802b and textbox 802c, respectively. When 'Show applications' button 806 is clicked, one or more software applications in the application cluster are filtered for generating a graph for the software applications classified under the corresponding values entered in textboxes 802.

The filtered software applications with business unit and geography as specified in textbox 802b and 802c, respectively, are reflected in list box 804. One or more software applications may then be selected from list box 804 to generate the graph.

In an embodiment of the invention, the data to be plotted on the X-axis for generating the graph may be selected from a list of criteria reflected in drop-down menu 808a. Similarly, the data to be plotted on the Y-axis may be selected from the list of criteria reflected in drop-down menu 808b. Thus, different graphs may be generated for a software application for different pairs of criteria selected from drop-down menu 808a and drop-down menu 808b.

Subsequently, the graph may be generated by clicking on 'View graph' button 810 and a transition plan may be prepared using the graph.

Figure 9:
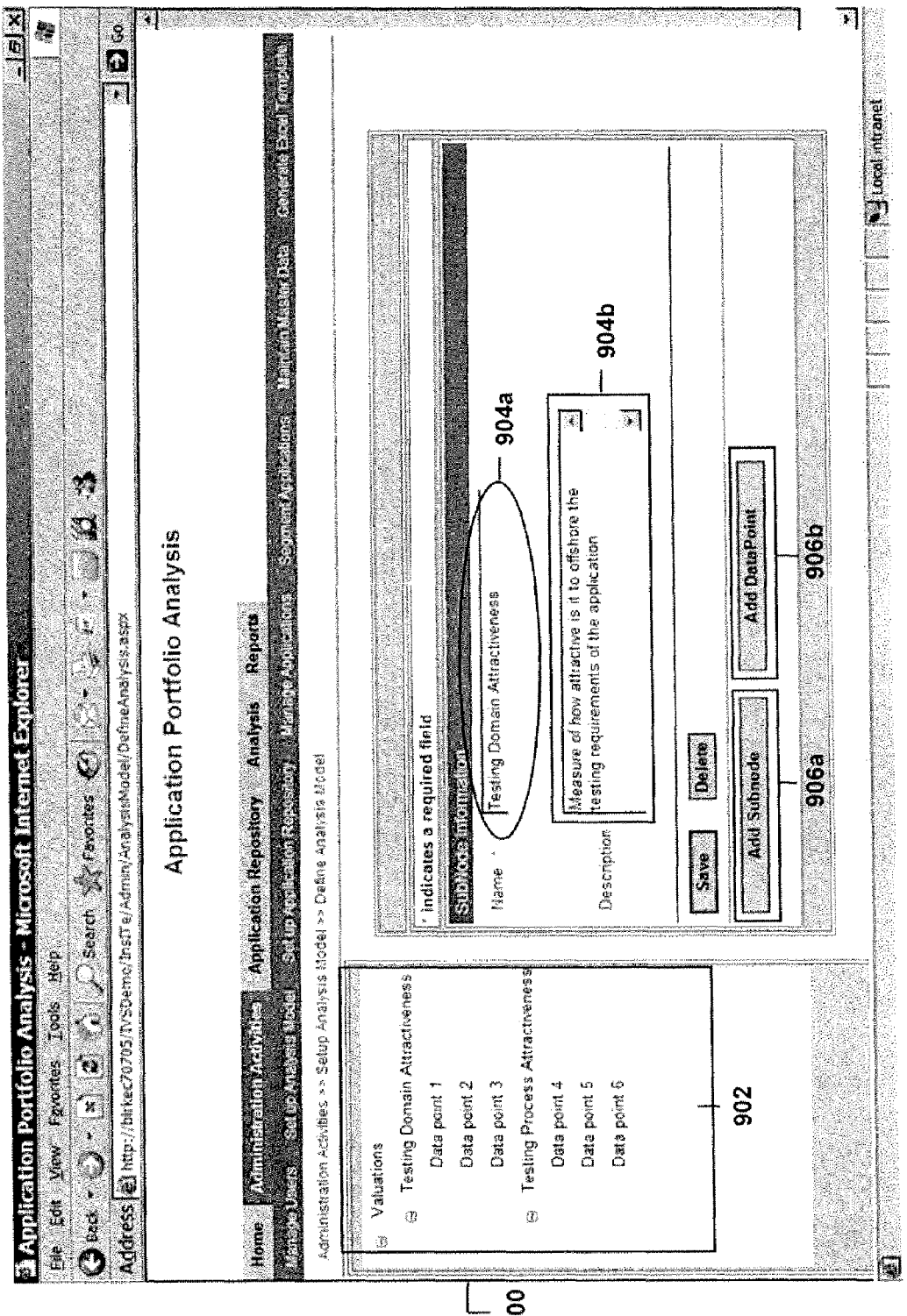
FIG. 9 is a screenshot of a user interface of a system for evaluating a plurality of software applications for offshore testing, in accordance with an exemplary embodiment of the invention.

FIG. 9 is a screenshot of a user interface 900 of a system such as system 300 for evaluating a plurality of software applications for offshore testing, in accordance with an exemplary embodiment of the invention.

User interface 900 includes a criteria model 902 including a hierarchy of criteria. One or more sub-criteria are also included for the criteria defined in criteria model 902. As a tool administrator such as a tool administrator from tool administrators 102 clicks on a criterion in criteria model 902, the name and description corresponding to the selected criterion may be defined in a textbox 904a and a textbox 904b, respectively. A criterion may be added to criteria model 902 by clicking on a button 906a. Further, a sub-criterion may be defined under a criterion by clicking on a button 906b.

Figure 10:
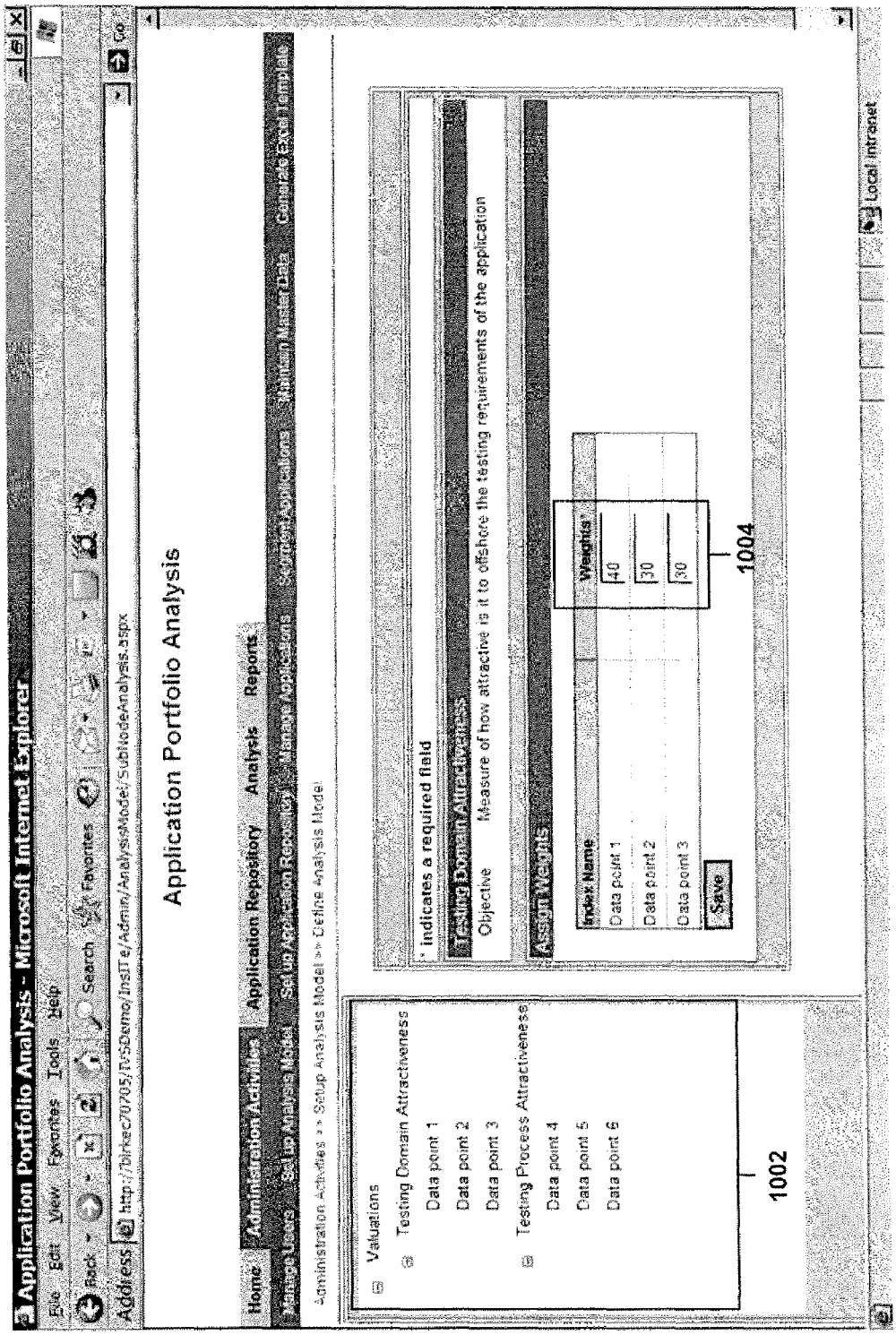
FIG. 10 is a screenshot of a user interface of a system for evaluating a plurality of software applications for offshore testing, in accordance with an exemplary embodiment of the invention.

FIG. 10 is a screenshot of a user interface 1000 of a system such as system 300 for evaluating a plurality of software applications for offshore testing, in accordance with an exemplary embodiment of the invention. User interface 1000 includes a criteria model 1002.

User interface 1000 enables a tool administrator such as a tool administrator from tool administrators 102 to assign weights to the one or more criteria in criteria model 1002. As the tool administrator selects a criterion, the weights corresponding to the one or more sub-criteria under the selected criterion may be defined in textboxes 1004.

Figure 11:
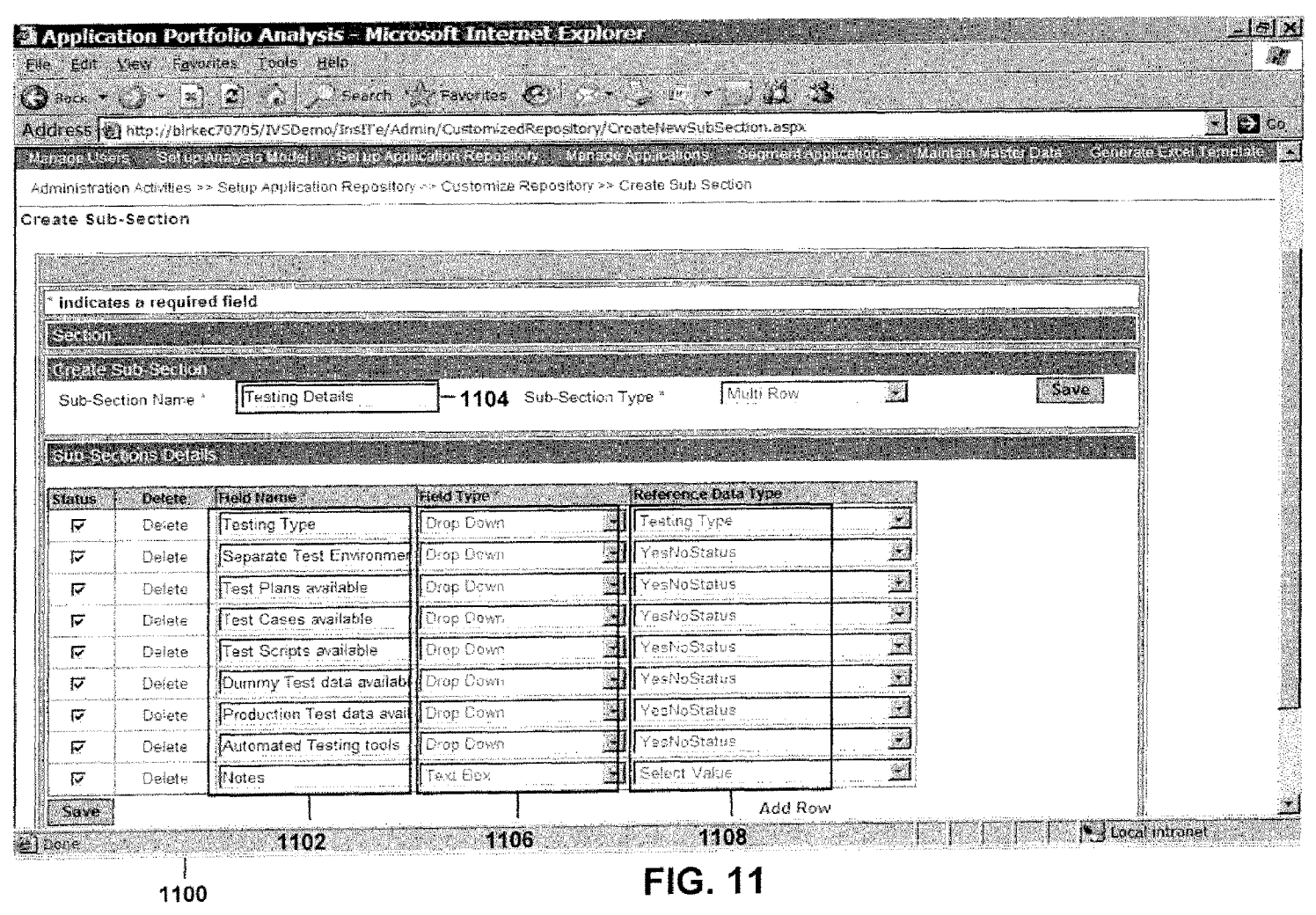

FIG. 11 is a screenshot of a user interface 1100 of a system such as system 300 for evaluating a plurality of software applications for offshore testing, in accordance with another exemplary embodiment of the invention.

User interface 1100 enables tool administrators 102 to define a set of parameters for evaluating the software applications. User interface 1100 includes a set of parameters 1102 classified under a section. As a tool administrator from tool administrators 102 enters the name of a section in a textbox 1104, set of parameters 1102 are reflected. One or more parameters from set of parameters 1102 may then be selected for evaluating the software applications. 'Field type' and 'Reference data type' corresponding to set of parameters 1102 may be selected from a drop-down menu 1106 and a drop-down menu 1108, respectively. In an embodiment of the invention, 'Field type' may correspond to the type of field such as a 'drop down' or a 'textbox', and 'reference data type' may correspond to the range of values that may be defined for the parameter. For example, for a parameter 'Test scripts available', a field type 'drop-down' may be selected and 'reference data type' may be selected as 'Yes/No status'.

Figure 12:
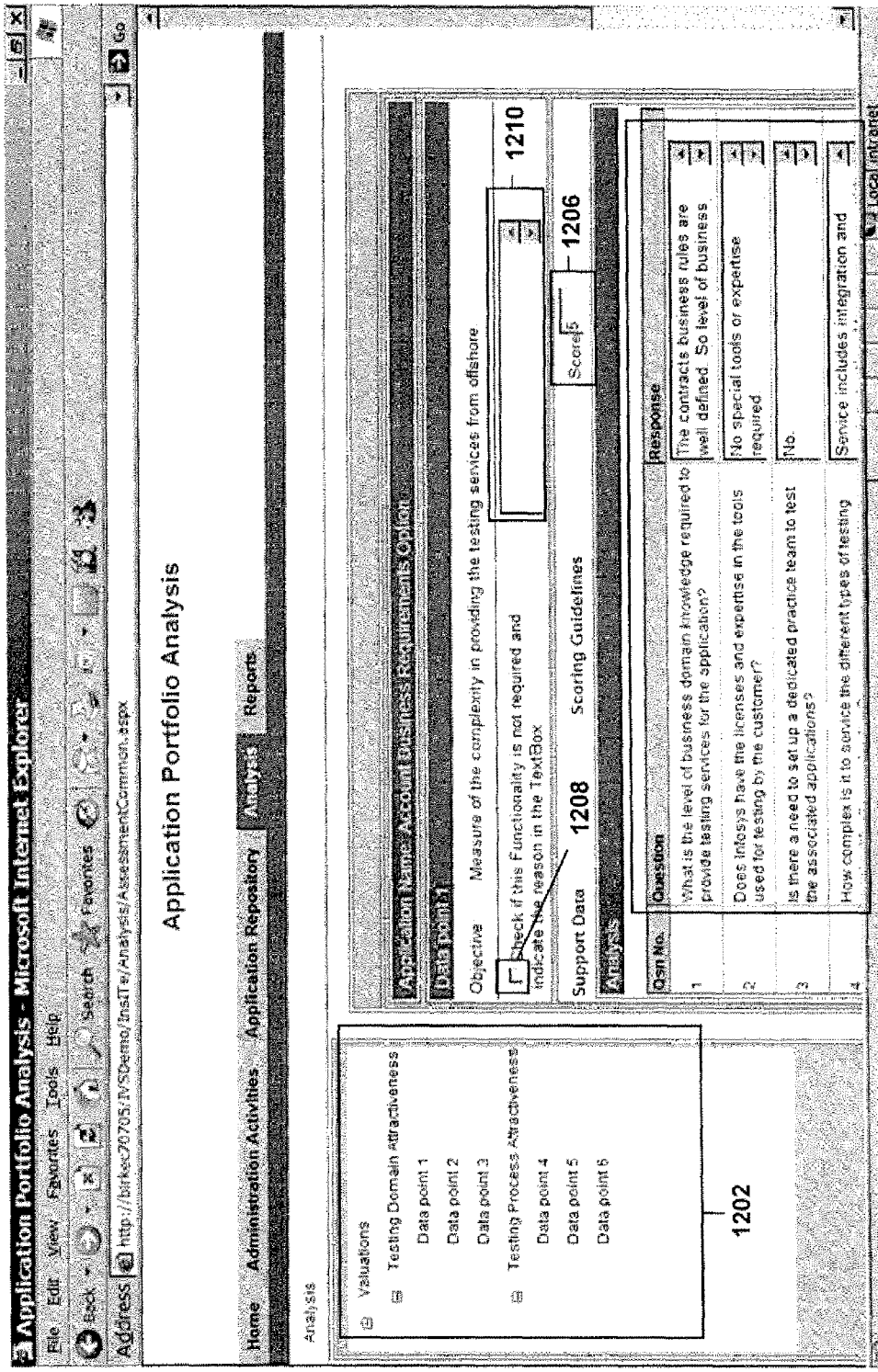
FIG. 12 is a screenshot of a user interface of a system for evaluating a plurality of software applications for offshore testing, in accordance with yet another exemplary embodiment of the invention.

FIG. 12 is a screenshot of a user interface 1200 of a system such as system 300 for evaluating a plurality of software applications for offshore testing, in accordance with yet another exemplary embodiment of the invention. User interface 1200 enables an expert such as an expert from experts 104 to assign scores to the plurality of software applications with reference to a criteria model 1202. After selecting a criterion in criteria model 1202, the expert may enter a score for the corresponding criterion in a textbox 1206. Further, the expert may refer to a set of questions 1204 for additional information related to the selected criterion. If, according to the expert, the selected criterion is irrelevant for offshore testing, the expert may check a checkbox 1208 and a corresponding reason for irrelevancy may be entered in a textbox 1210.

Figure 13:
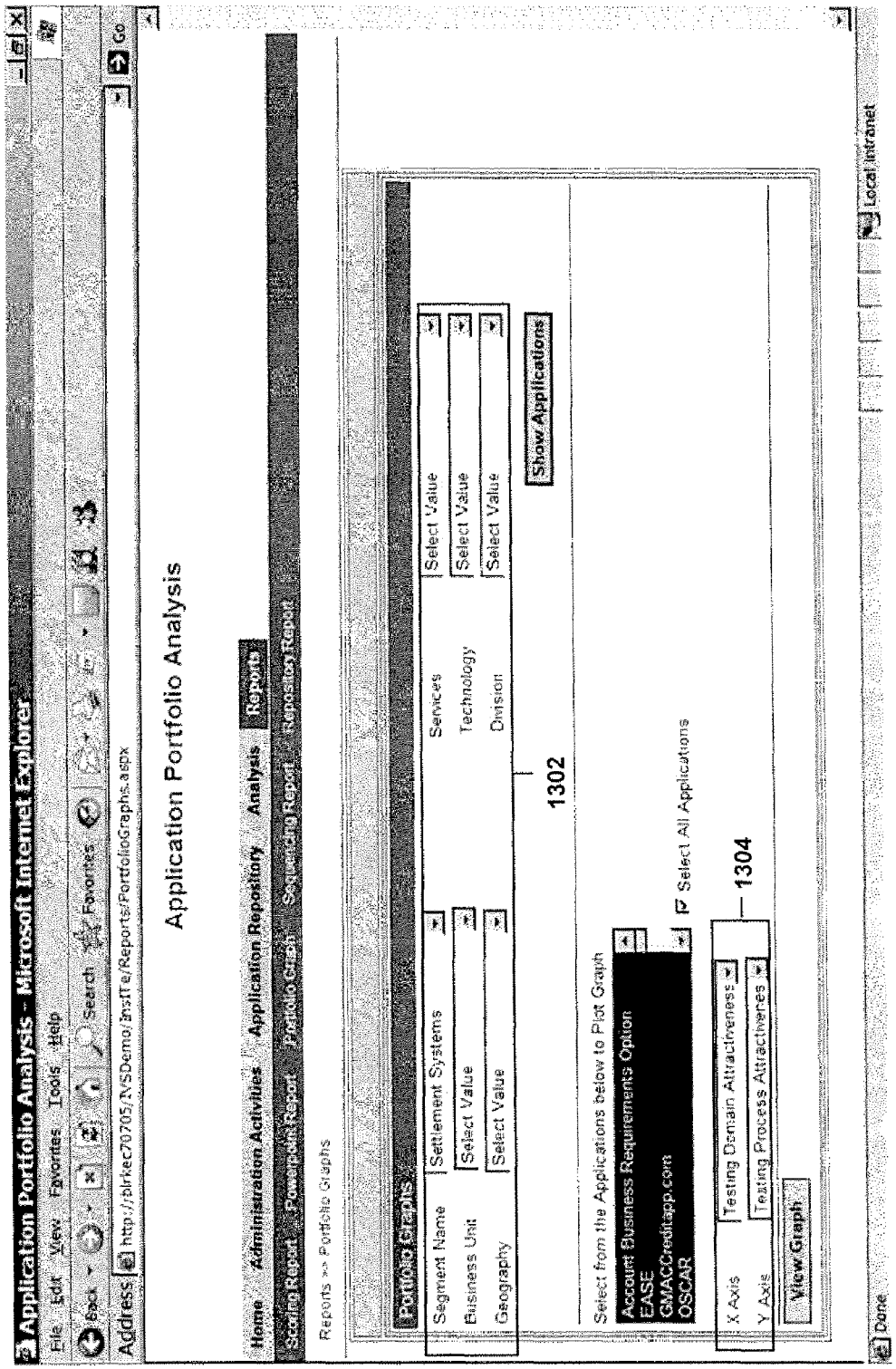
FIG. 13 is a screenshot of a user interface of a system for evaluating a plurality of software applications for offshore testing, in accordance with still another exemplary embodiment of the invention.

FIG. 13 is a screenshot of a user interface 1300 of a system such as system 300 for evaluating a plurality of software applications for offshore testing, in accordance with still another exemplary embodiment of the invention. User interface 1300 enables an expert such as an expert from experts 104 to generate one or more graphs for one or more of the plurality of software applications. The name of a cluster and one or more parameters such as 'geography' and 'division' for filtering the one or more software applications may be defined using drop-down menus 1302. Thereafter, values for the X-axis and the Y-axis for the graph may be defined using drop-down menus 1304. In an embodiment of the invention, the values for the X and Y axes may be selected from the one or more criteria reflecting in drop-down menus 1304.

Figure 14:
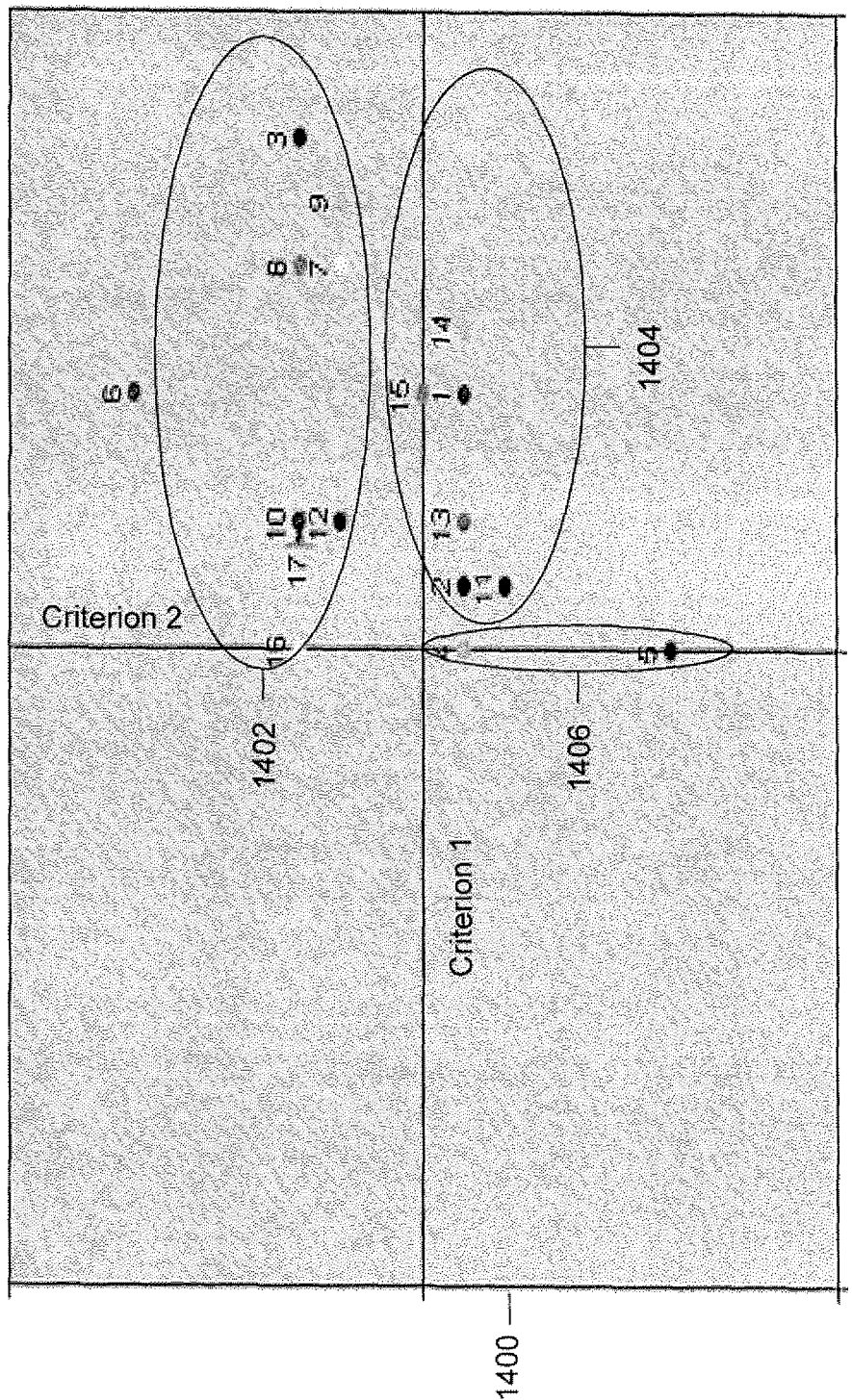
FIG. 14 is a screenshot of a graph used for preparing a transition plan for offshore testing of a plurality of software applications, in accordance with another exemplary embodiment of the invention.

FIG. 14 is a screenshot of a graph 1400 used for preparing a transition plan for offshore testing of a plurality of software applications, in accordance with another exemplary embodiment of the invention.

Graph 1400 is generated by plotting cumulative scores of 'Criterion 1' and 'Criterion 2' on the X-axis and Y-axis, respectively. 'Criterion 1' and 'Criterion 2' may be selected from the one or more criteria used for evaluating the software applications for offshore testing. One or more groups of software applications may be created using graph 1400 in order to prepare a transition plan for offshore testing. 1402 is an exemplary group of software applications that are identified as software applications that are ideal for offshore testing 1404 is another exemplary group of software applications that may be transitioned at a later stage after software applications in group 1402 have been offshored for testing. Similarly, 1406 is yet another group of software applications that cannot be offshored for testing and may be evaluated again at a later stage.

The method and system for evaluating a plurality of software applications for offshore testing have a number of advantages. A criteria model is defined for assessing the viability of offshore testing of the plurality of software applications. The criteria model enables the definition of a structured framework for evaluation of the software applications. One or more experts then assign scores to each of the plurality of software applications with reference to the criteria model. Therefore, the testing requirements of each software application are analyzed by the one or more experts. Further, a transition plan for offshore testing may also be defined using the graph. Thus, the plurality of software applications may be offshored for testing over multiple phases according to the readiness of the offshore vendor to take up offshore testing.

The system for evaluating a plurality of software applications for offshore testing, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer further comprises a microprocessor. The microprocessor is connected to a communication bus. The computer also includes a memory. The memory may include Random Access Memory (RAM) and Read Only Memory (ROM). The computer system further comprises a storage device. The storage device can be a hard disk drive or a removable storage drive such as a floppy disk drive, optical disk drive, etc. The storage device can also be other similar means for loading computer programs or other instructions into the computer system. The computer system also includes a communication unit. The communication unit allows the computer to connect to other databases and the Internet through an I/O interface. The communication unit allows the transfer as well as reception of data from other databases. The communication unit may include a modem, an Ethernet card, or any similar device which enables the computer system to connect to databases and networks such as LAN, MAN, WAN and the Internet. The computer system facilitates inputs from a user through input device, accessible to the system through I/O interface.

The computer system executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the present invention. The set of instructions may be in the form of a software program. Further, the software may be in the form of a collection of separate programs, a program module with a larger program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

The invention claimed is:

1. A method for identifying one or more software applications from a plurality of software applications for offshore testing, the plurality of software applications supporting one or more functions of a business establishment, the method comprising:
   a. defining by a processor a criteria model comprising one or more criteria for assessing the viability of offshore testing of the plurality of software applications;
   b. assigning by the processor scores to each of the plurality of software applications with reference to each of the one or more criteria, wherein the scores are assigned by one or more experts based on a predefined scale; and
   c. evaluating by the processor the plurality of software applications based on the assigned scores for identifying the one or more software applications for offshore testing.

2. The method according to claim 1, wherein evaluating the plurality of software applications further comprises creating a graph for classifying the plurality of software applications based on the assigned scores, the graph being used for the identification of the one or more software applications.

3. The method according to claim 1, wherein an offshoring transition plan is defined for the identified one or more software applications.

4. A method for identifying one or more software applications from a plurality of software applications for offshore testing, the plurality of software applications supporting one or more functions of a business establishment, the method comprising:
 a. defining by a processor a criteria model comprising one or more criteria for assessing the viability of offshore testing of the plurality of software applications;
 b. defining by the processor weights for each of the one or more criteria, the weights being defined based on the importance of the one or more criteria in offshore testing of the plurality of software applications;
 c. assigning by the processor scores to each of the plurality of software applications with reference to each of the one or more criteria, wherein the scores are assigned by one or more experts based on a predefined scale;
 d. calculating by the processor one or more cumulative scores for each of the plurality of software applications, the one or more cumulative scores being calculated based on the defined weights and the assigned scores; and
 e. evaluating by the processor the plurality of software applications based on the one or more cumulative scores for identifying the one or more software applications for offshore testing.

5. The method according to claim 4, wherein defining the plurality of software applications comprises providing application details for each of the plurality of software applications corresponding to a set of predefined parameters.

6. The method according to claim 5, wherein the set of predefined parameters are set by one or more tool administrators.

7. The method according to claim 4, wherein defining the criteria model comprises defining one or more sub-criteria for the one or more criteria.

8. The method according to claim 4 further comprising associating by the processor, a set of questions with each of the one or more criteria for describing the one or more criteria, wherein the one or more experts refer to the set of questions for assigning the scores to the plurality of software applications.

9. The method according to claim 4, wherein evaluating the plurality of software applications comprises creating one or more application clusters, each of the one or more application clusters comprising at least one of the plurality of software applications.

10. The method according to claim 9 further comprising generating by the processor, a report for each of the one or more application clusters for evaluating the at least one software application comprised in the one or more application clusters, the report being generated based on the one or more cumulative scores of the at least one software application.

11. The method according to claim 4, wherein evaluating the plurality of software applications further comprises creating a graph for classifying the plurality of software applications based on the one or more cumulative scores, the graph being used for the identification of the one or more software applications.

12. The method according to claim 4, wherein an offshoring transition plan is defined for the identified one or more software applications.

13. A system for identifying one or more software applications from a plurality of software applications for offshore testing, the plurality of software applications supporting one or more functions of a business establishment, the system comprising:
 a. a software application definition module configured for enabling one or more tool administrators to define the plurality of software applications to be evaluated;
 b. a criteria definition module configured for defining one or more criteria for assessing the viability of offshore testing of the plurality of software applications;
 c. a weight definition module configured for defining weights for each of the one or more criteria;
 d. a score assignment module configured for enabling one or more experts to assign scores to each of the plurality of software applications with reference to each of the one or more criteria; and
 e. a calculation module configured for calculating one or more cumulative scores for each of the plurality of software applications, the one or more cumulative scores being calculated based on inputs received from the weight definition module and the score assignment module, wherein the one or more software applications are identified based on the one or more cumulative scores.

14. The system according to claim 13, wherein the software application definition module comprises a parameter definition module configured for enabling the one or more tool administrators to define a set of parameters for evaluating the plurality of software applications.

15. The system according to claim 13, wherein the criteria definition module is further configured for enabling the one or more tool administrators to associate a set of questions with each of the one or more criteria, the set of questions describing the one or more criteria.

16. The system according to claim 13 further comprising a cluster creation module configured for creating one or more application clusters, each of the one or more application clusters comprising at least one of the plurality of software applications.

17. The system according to claim 16 further comprising a report generation module configured for generating a report for each of the one or more application clusters for evaluating the at least one software application.

18. The system according to claim 13 further comprising a graph generation module for generating a graph for classifying the plurality of software applications based on inputs received from the calculation module, wherein the graph is used for the identification of the one or more software applications.

19. A non-transitory computer readable medium for use in a business establishment, the non-transitory computer readable medium having a computer readable program code embodied therein for identifying one or more software applications from a plurality of software applications for offshore testing, the computer readable program code performing:
 a. enabling one or more tool administrators to define a criteria model for defining one or more criteria for assessing the viability of offshore testing of the plurality of software applications;
 b. enabling the one or more tool administrators to define weights for each of the one or more criteria, the weights being defined based on the importance of the one or more criteria in offshore testing of the plurality of software applications;
 c. enabling one or more experts to assign scores to each of the plurality of software applications with reference to each of the one or more criteria;
 d. calculating one or more cumulative scores for each of the plurality of software applications, the one or more cumulative scores being calculated based on the defined weights and the assigned scores; and e. enabling the one or more experts to evaluate the plurality of software applications based on the one or more cumulative scores for identifying the one or more software applications for offshore testing.

20. The non-transitory computer readable medium of claim 19, wherein the computer readable program code further performs enabling the one or more tool administrators to create one or more application clusters, each of the one or more application clusters comprising at least one of the plurality of software applications.

21. The non-transitory computer readable medium of claim 20, wherein the computer readable program code further performs generating a report for each of the one or more application clusters for evaluating the at least one software application comprised in the one or more application clusters, the report being generated based on the one or more cumulative scores of the at least one software application.

22. The non-transitory computer readable medium of claim 19, wherein the computer readable program code further performs generating a graph for classifying the plurality of software applications based on the one or more cumulative scores.

* * * * *